United States Patent
Harmon et al.

(10) Patent No.: US 7,094,367 B1
(45) Date of Patent: Aug. 22, 2006

(54) TRANSPARENT POLYMER CARBON NANOTUBE COMPOSITES AND PROCESS FOR PREPARATION

(75) Inventors: Julie P. Harmon, Tampa, FL (US); LaNetra Michelle Clayton, Plant City, FL (US); Patricia Muisener, Clearwater, FL (US)

(73) Assignee: University of Florida, Tampa, FL (US)

( * ) Notice: Subject to any disclaimer, the term of this patent is extended or adjusted under 35 U.S.C. 154(b) by 359 days.

(21) Appl. No.: 10/604,735

(22) Filed: Aug. 13, 2003

Related U.S. Application Data (60) Provisional application No. 60/319,467, filed on Aug. 13, 2002.

(51) Int. Cl.
- H01B 1/24 (2006.01)
- B05D 7/00 (2006.01)
- C08F 2/46 (2006.01)
- C08J 7/18 (2006.01)

(52) U.S. Cl. .......... 252/511; 252/502; 252/500; 427/212; 427/258; 427/487; 423/445 B (58) Field of Classification Search .......... 252/502, 252/511; 423/445 B, 487; 428/922, 924; 526/328.5, 329.7
See application file for complete search history.

(56) References Cited

U.S. PATENT DOCUMENTS

| | | | | |
|---|---|---|---|---|
| 5,686,183 A | * | 11/1997 | Nishiwaki | 428/408 |
| 5,908,585 A | * | 6/1999 | Shibuta | 252/506 |
| 2002/0001620 A1 | * | 1/2002 | Pienkowski et al. | 424/486 |
| 2002/0048632 A1 | * | 4/2002 | Smalley et al. | 427/230 |
| 2002/0197474 A1 | * | 12/2002 | Reynolds | 428/398 |
| 2003/0158323 A1 | * | 8/2003 | Connell et al. | 524/495 |

FOREIGN PATENT DOCUMENTS

WO  WO 03/040026 A2  5/2003

OTHER PUBLICATIONS

Jia et al,"Study on poly(methyl methacrylate)/carbon nanotube composites," Mat. Sci. and Eng., 1999, A271, pp. 395-400.*

Kim et al, "Nanocomposite Fibers," National Textile Center Annual Report, Nov. 2001, M00-D08, pp. 1-10.*

* cited by examiner

*Primary Examiner*—Mark Kopec
*Assistant Examiner*—Kallambella Vijayakumar
(74) *Attorney, Agent, or Firm*—Molly L. Sauter; Smith & Hopen, P.A.

(57) ABSTRACT

The present invention provides a method for the effective dispersion of carbon nanotubes into a polymer matrix. Through a combination of dispersion through sonication, in situ polymerization, dissolution, and film casting, transparent polymer carbon nanotube composites are produced.

22 Claims, 10 Drawing Sheets

| Samples | Refractive Index (589nm, 25°C) |
|---|---|
| UV Neat | 1.4916 + 0.0005 |
| UV Composite | 1.4913 ± 0.0005 |
| Oven Neat | 1.4919 ± 0.0005 |
| Oven Composite | 1.4910 ± 0.0005 |
| Gamma Neat | 1.4919 ± 0.0005 |
| Gamma Composite | 1.4913 ± 0.0005 |

FIG 5

| Sample | ε' @ 25°C |
|---|---|
| UV Neat | 4.99 |
| UV Comp | 7.29 |
| % Change | 46.1 |
|  |  |
| Oven Neat | 3.74 |
| Oven Comp | 4.75 |
| % Change | 27.0 |
|  |  |
| Gamma Neat | 3.71 |
| Gamma Comp | 4.56 |
| % Change | 23.0 |

FIG 6

| Sample | Tg | Sample | Tg |
|---|---|---|---|
| UV neat PMMA | 119 | UV PMMA/SWNT | 122 |
| Oven neat PMMA | 118 | Oven PMMA/SWNT | 118 |
| Gamma neat PMMA | 120 | Gamma PMMA/SWNT | 121 |

DSC: Heat polymerized Neat PMMA

DSC : Heat Polymerized PMMA/SWNT Composite

FIG 9

DSC: Ionizing (gamma) Radiation Polymerized PMMA/SWNT Composite

DSC: Ionizing (gamma) Radiation polymerized neat PMMA

FIG 10

TRANSPARENT POLYMER CARBON NANOTUBE COMPOSITES AND PROCESS FOR PREPARATION

CROSS REFERENCE TO RELATED APPLICATIONS

This application is a continuation-in-part of U.S. Provisional Patent Application Ser. No. 60/319,467 filed Aug. 13, 2002.

BACKGROUND OF INVENTION

Carbon nanotubes were discovered in 1991 by Iijima on the negative electrode during the direct current arching of graphite for the preparation of fullerenes. Nanotubes are concentric graphitic cylinders closed at either end due to the presence of five membered rings. Carbon nanotubes can either be multi walled or single walled. Multi-walled nanotubes (MWNT) have a central tubule surrounding graphitic layers whereas single walled nanotubes (SWNT) have only one tubule and no graphitic layers.

Single-walled carbon nanotubes (SWNT) have moved to the forefront of present and future nanoscale discoveries that will serve as a portal into the enhancement of modern technology. Many different applications of carbon nanotubes have recently been developed, including the use of nanoscale transistors and chemical sensors. Carbon nanotubes exhibit a high aspect ratio, mechanical strength, and high moduli. These properties have spurred an interest in fabricating polymer-nanotube composites.

Composites are developed to achieve desired properties that cannot be obtained from the individual components. By fabricating materials with properties of the individual components and creating a material with novel properties that are specific to the composite and not to the individual components, a stronger and more useful material exists. As a result, polymer-nanotube composites have several useful applications such as structural supports for building, spacecrafts, and military aircrafts, non-linear optics, nano-wires, battery cathodes and ionics.

Various methods are known in the art to disperse carbon nanotubes in a polymer matrix. These known methods include: (1) solution mixing of polymer and carbon nanotubes; (2) a combination of sonication and melt processing; (3) melt blending and; (4) in-situ polymerization in the presence of nanotubes.

Advancements are known in the art providing methods of carbon nanotube dispersion in a polymer matrix, however the resulting nanocomposites produced to date exhibited limited transparency in the visible range.

There remains a need, therefore, for a method of preparation for nanocomposites that overcomes the shortcoming previously experienced with the dispersion of CNTs in polymer matrices. The resulting novel nanocomposites exhibit increased transparency and improved dielectric properties.

However, in view of the prior art considered as a whole at the time the present invention was made, it was not obvious to those of ordinary skill in the pertinent art how the identified need could be fulfilled.

SUMMARY OF INVENTION

Unknown;Anton J. Hopen;According to a preferred embodiment, the present invention provides a method of preparing a polymer-carbon nanotube composite. The method comprises deinhibiting a monomer, dispersing carbon nanotubes in the deinhibited monomer, adding an initiator to the resulting dispersion, polymerizing the monomer in the presence of the dispersed nanotubes and initiator to form a composite, and dissolving the resulting composite in a solvent.

In an additional embodiment, the carbon nanotubes are selected from the group consisting of single-walled and multi-walled carbon nanotube.

In yet another embodiment, the carbon nanotubes are pure single-walled carbon nanotubes.

In a preferred embodiment, the monomer is a vinyl monomer belonging to the family of acrylates.

According to another embodiment, the monomer is methyl methacrylate.

In another embodiment, the inhibitor in the methyl methacrylate monomer is removed utilizing monoethyl ether hydroquinone inhibitor remover.

In an additional embodiment, dispersing the nanotubes is affected through sonication.

In a preferred embodiment, the photoinitiator is substantially transparent.

In yet another embodiment, the initiator is an $\alpha$, $\alpha$dialkyl derivative of $\alpha$hydroxyalkylphenone.

In an additional embodiment, the initiator is 1-phenyl-2-hydroxy-2-methyl-1 propanone.

In a preferred embodiment, nitrogen gas is bubbled through the mixture in order to reduce the prescence of oxygen in the system which may result in unwanted byproducts in the reaction In another embodiment, polymerizing the dispersion is achieved utilizing ultraviolet light.

In an additional embodiment, polymerizing the dispersion is achieved utilizing thermal heating.

In yet another embodiment, polymerizing the dispersion is achieved utilizing Ionizing gamma radiation.

In a preferred embodiment, the solvent is methylene chloride.

In an additional embodiment, the volume of methylene chloride establishes a 5% dissolved composite solution. Other concentrations may be considered In another embodiment, the composite is post-cured prior to dissolving in the solution.

In an additional embodiment, isolating the nanocomposite film is achieved by removal of the solvent after the dissolving step.

In a preferred embodiment of the present invention, a method of preparing a polymer-carbon nanotube composite is provided. The method comprising of deinhibiting methyl methacrylate monomer, placing single-wall carbon nanotubes into the deinhibited monomer to form a nanotube mixture, sonicating the nanotube mixture for a duration sufficient to disperse the nanotubes in the monomer, placing the dispersed mixture into a reaction vessel, adding the photoinitiator, 1-phenyl-2-hydroxy-2-methyl-1 propanone, to the reaction vessel, bubbling nitrogen gas through the mixture for a duration sufficient to allow a nitrogen environment in the system, polymerizing the monomer in the presence of the dispersed nanotubes to produce a composite, and dissolving the resulting composite in methylene chloride.

In an additional embodiment, the monomethyl ether hydroquinone inhibitor is removed from the methyl methacrylate monomer to deinhibit the monomer.

In another embodiment, the single-walled carbon nanotubes are 0.26% pure single-walled carbon nanotubes.

In an additional embodiment, polymerizing is achieved utilizing ultraviolet light.

In yet another embodiment, polymerizing is achieved utilizing thermal heating.

In another embodiment, polymerizing is achieved utilizing Ionizing gamma radiation.

The process described by the present invention produces a substantially optically transparent polymer carbon nanotube composite.

An advantage of the present invention is the effective dispersion of carbon nanotubes into a polymer matrix. The present invention discloses a novel method by which dispersion through sonication, polymerization by UV radiation, thermal heating or Ionizing gamma radiation, and dissolution in methylene chloride produces a solution used to prepare PMMA/SWNT composite films with variable degrees of transparency.

BRIEF DESCRIPTION OF DRAWINGS

For a fuller understanding of the nature and objects of the invention, reference should be made to the following detailed description, taken in connection with the accompanying drawings, in which.

DETAILED DESCRIPTION

The present invention provides a preparation process for polymer carbon nanotube composites exhibiting high retention of optical transparency and high electrical conductivity.

Carbon nanotube composites exhibit enhanced properties such as strength and stiffness. It has been shown through Dynamic Mechanical Analysis that poly(methyl methacrylate)/multi-walled carbon nanotubes composites characterize moduli that increase with nanotube concentrations from 4% to 26%.

It has been documented that the dielectric permittivity of poly(methyl methacrylate) and other insulating polymers has been shown to increase significantly by the addition of single walled carbon nanotubes (SWNTs).

The chemical modification of nanotubes further broadens their uses in polymeric composites. Experimental results indicate that certain free radical initiators open Π bonds in carbon nanotubes. Indeed, when present during the polymerization of methyl methacrylate, carbon nanotubes have been shown to participate in the polymerization process.

The polymer matrix, poly (methyl methacrylate) (PMMA), is obtained from the free radical polymerization of the vinyl monomer methyl methacrylate. PMMA is a clear thermoplastic that is used as a replacement for glass where a shatterproof material is needed. The industrial names for PMMA are PLEXIGLASS and LUCITE. Due to its increased use in many applications that result in exposure to solar energy and ionizing radiation, PMMA is a well-characterized polymer. It is within the scope of the present invention to utilize PMMA in addition to other polymers.

The following examples are provided for illustrative purposes and do not serve to limit the scope of the invention.

The composites according to the present invention were prepared by first removing the inhibitor in the methyl methacrylate monomer with monoethyl ether hydroquinone inhibitor remover. Pure single-walled carbon nanotubes provided by NASA Ames Research were placed in the deinhibited methyl methacrylate monomer. The mixture was sonicated with a Branson Sonifier 450 until the nanotubes were finely dispersed in the monomer. 0.5% (w/w) of the initiator, 1-phenyl-2-hydroxy-2-methyl-1 propanone, were added. The initiator, 1-phenyl-2-hydroxy-2-methyl-1 propanone, is an α-αdialkyl derivative of αhydroxyalkylphenone. Nitrogen gas was bubbled through the mixture for one minute.

The sample was then allowed to polymerize utilizing one of three different polymerization methods: UV light, heat and gamma radiation. Utilizing UV light, the sample was polymerized under UV light (220–280 nm) for five hours. The sample was placed 19 mm from the UV source. Utilizing the gamma polymerization method, a cesium-137 gamma source was used to expose the sample to ionizing radiation for 41 hours at a dose rate of 985 rads/min and a total dose of 2.42 Mrads. Utilizing the oven polymerizatin method, the sample was heated in an oven at 70° C. for 16 hours.

After polymerization, the sample was allowed to post-cure in the oven for 4 hours at a temperature of 70° C. Neat PMMA samples were also prepared via all three methods. The sample was then dissolved in methylene chloride to make a 5% solution (w/w).After the sample dissolved completely, films were prepared for analysis by solvent evaporation. The film thickness ranged from 0.08 mm 1.5 mm. The films were heated in a vacuum oven with a liquid nitrogen trap for eight days at a temperature of 80° C. to remove any residual solvent. The light grey hue of the solution provided visual indication that nanotubes were present in the solution. Images were captured on the Scanning Electron Microscopy (SEM) to insure that the carbon nanotubes were in fact present in the solution. The transparent polymer-nanotube composites were used to cast films of the composite solution before the nanotubes reagglomerated.

Figure 1:
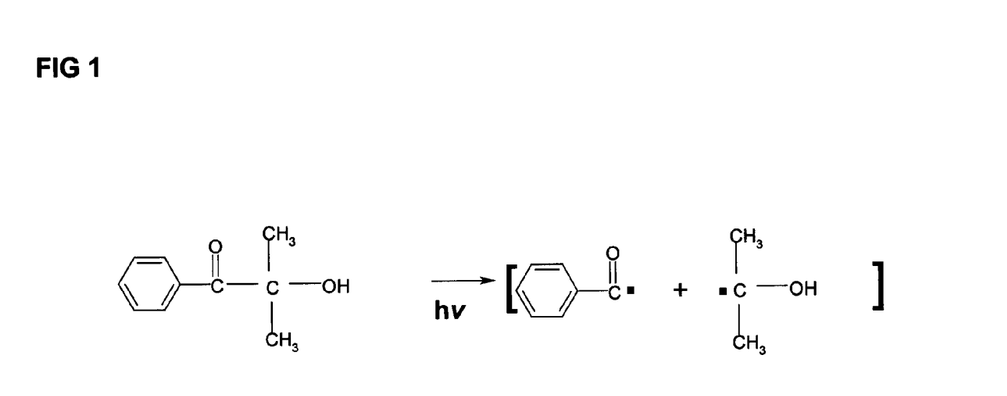
FIG. 1 illustrates the α cleavage in which this photoinitiator undergoes exposed when exposed to uv light.
Figure 2:
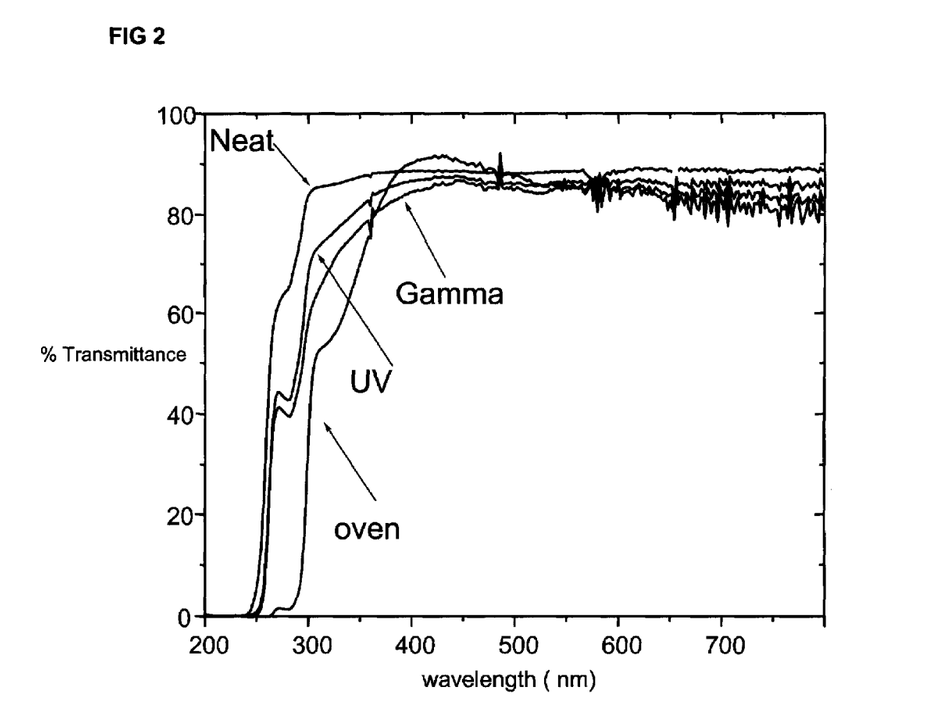
FIG. 2 illustrates uv-vis spectra of all composites prepared by all three polymerization processes.
Figure 3:
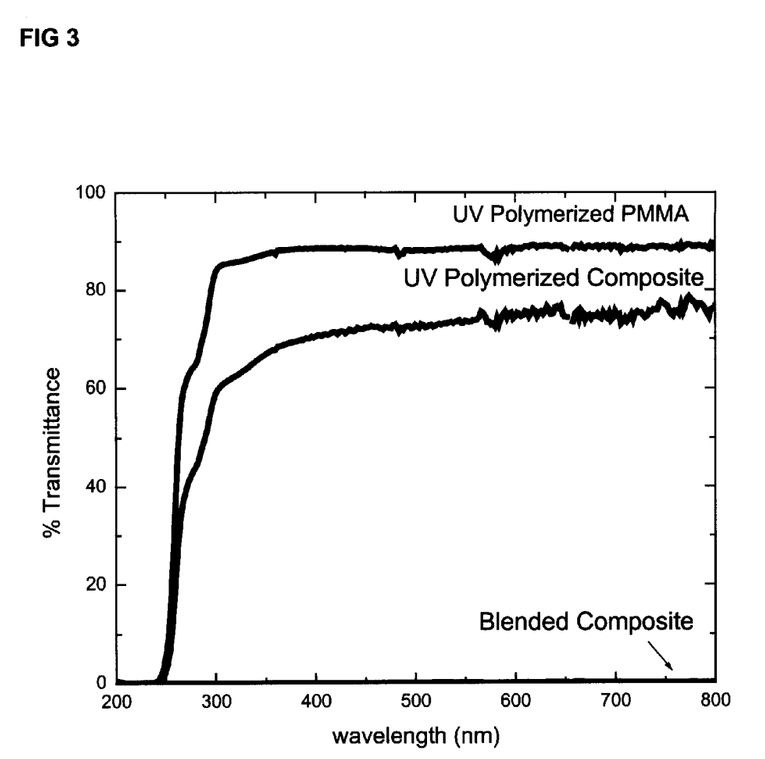
FIG. 3 illustrates the uv-vis spectra of the UV polymerized neat PMMA and PMMA/SWNT compared to the melt-blended composites PMMA/SWNT composite.

Ultraviolet-visible spectroscopy (UV-VIS) is used for the detection of atoms and molecules with transitions between electronic energy levels from 200 nm to 800 nm, * * specifically n→Π* or Π→Π*. Although absorption and % transmittance can be obtained from the UV-VIS, transmittance data was desired. The % transmittance is defined as the amount of light that passes through the sample. Measuring the % transmittance allows for the determination of the degree of transparency of the sample. Thus, transparencies of these films were quantified by measuring the UV-VIS transmittance. Ultraviolet-visible spectroscopy was performed with an HP 8452A spectrophotometer. Air served as the blank and the film disc was used to obtain the spectra. Solvent evaporated films with a thickness of 0.005 in. were obtained in order to perform uv-vis analysis. FIG. 2 shows the uv-vis spectra of all composites prepared by all three polymerization processes: oven polymerized, UV polymerized, and Gamma polymerized. The neat PMMA exhibited a transmittance above 80% at 300 nm. The polymerized composites showed a 60% transmittance at 300 nm, whereas a melt-processed composite used for comparison had a 0% transmittance (not shown) for all wavelengths (200 nm–800 nm). There is indication of C=O absorption present around 280 nm. The spectra for the UV polymerized neat PMMA and the PMMA/SWNT composite and the melt-blended PMMA/SWNTcomposite are shown in FIG. 3. From the spectra, it is apparent that the carbonyl group from the poly (methyl methacrylate) exhibits a bathochromic shift for the composite samples. This occurance is attributed to the interaction of the carbon nanotubes with the PMMA ester side group and the behavior of the photolytic (uv and gamma) and thermal (oven) polymerization effects. The fabrication of a PMMA/SWNT composite with a transmittance above 50% is the most transparent film known to date. Through reproducible experiments, it has been proven that through a combination of dispersion through sonication, in situ polymerization and dissolution, thin films with varying degrees of transparency can be achieved. To date this is the first use of these combining steps to disperse nanoparticles in a polymer matrix to achieve transparent film.

Figure 4:
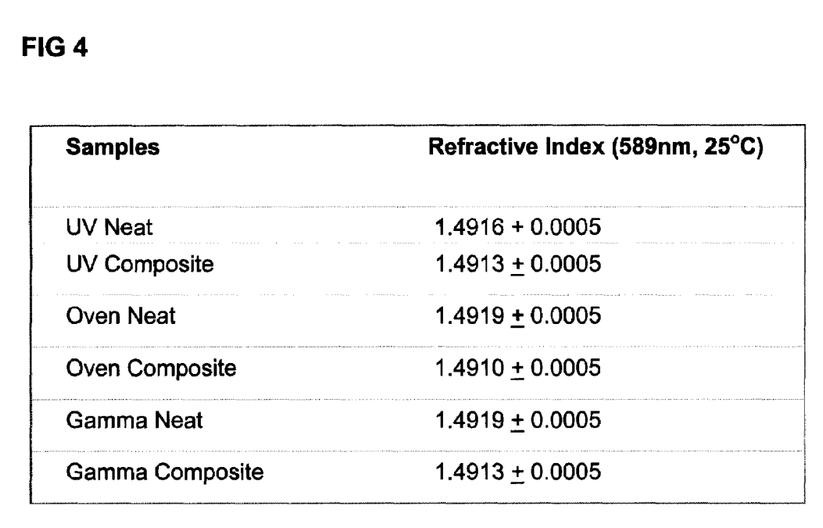
FIG. 4 provides a table illustrating the refractive indices of the neat and composite samples for each polymerization method.

Solvent evaporated films with a thickness of 0.005 in. were measured on an Index Instruments CLR 12–70 contact lens refractometer to obtain the refractive index values. The refractive index measures the amount of refraction caused when light passes through a medium. The refractive index of PMMA is known to be 1.49. The table of FIG. 4 illustrates the refractive indices of the neat and composite samples for each polymerization method. The refractive indices for the composite samples were consistently lower than their neat counterparts. The UV polymerized composite had a refractive index of 1.4913 and the neat PMMA had a refractive index of 1.4916. The refractive index for the composite sample is lower than the neat. Although there is a presence of carbon nanotubes in the sample, the difference of 0.0003 in the refractive index between the neat PMMA and the composites shows that the optical behavior of the composite is similar to the neat. Thus, achieving a composite with desired properties beneficial to optics.

Figure 5:
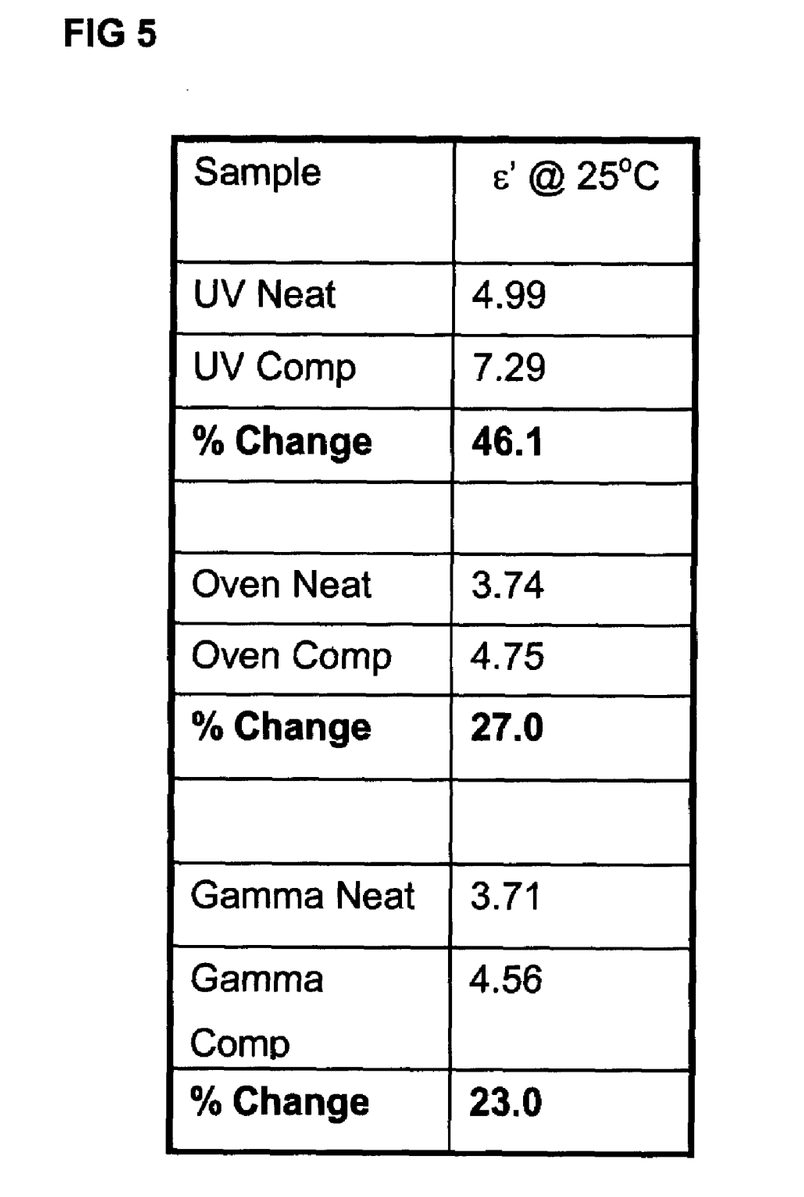
FIG. 5 provides a table illustrating the dielectric constant of neat PMMA and the composite samples.
Figure 6:
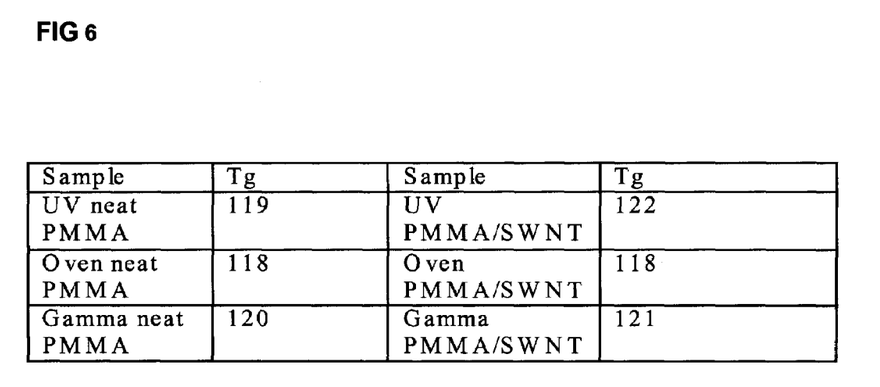
FIG. 6 provides a table illustrating the Differential Scanning Calorimetry data for the UV, Heat and gamma polymerized neat PMMA and PMMA/SWNT nanocomposites.
Figure 7:
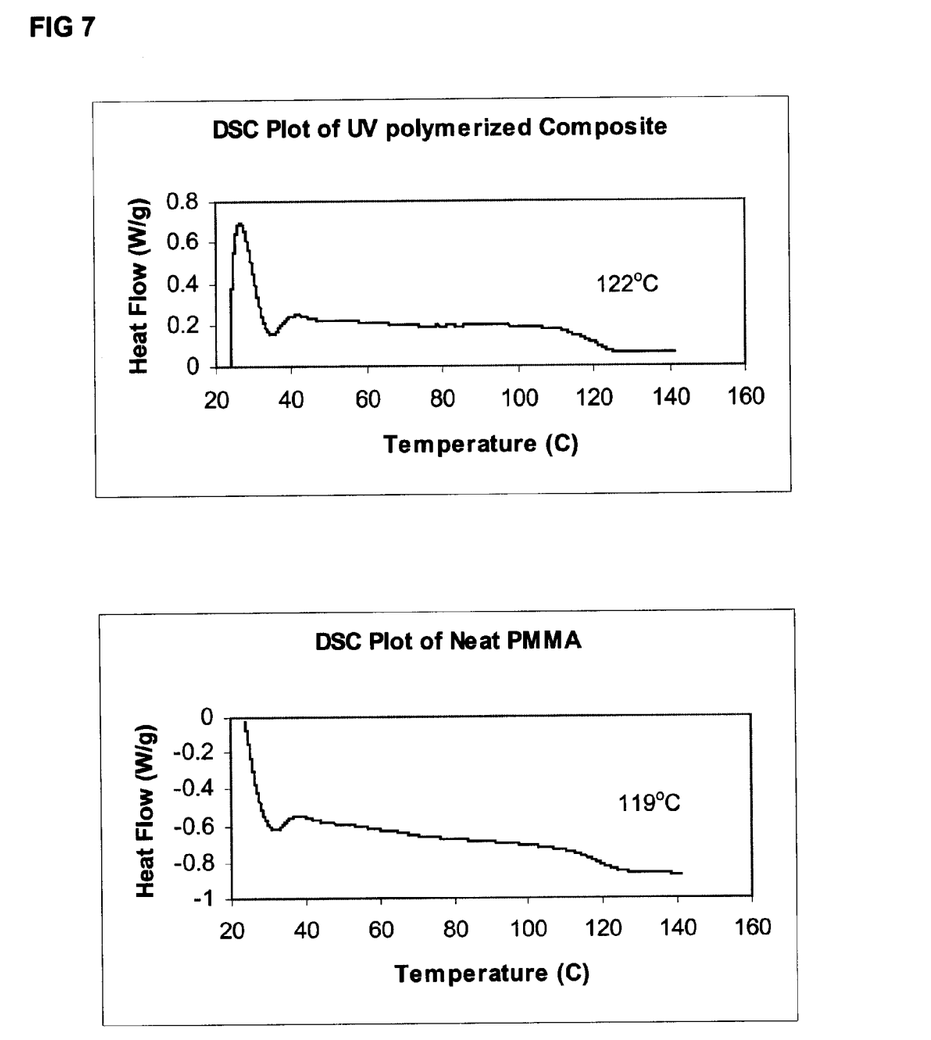
FIG. 7 illustrates the Differential Scanning Calorimetry plot of the UV polymerized neat PMMA and the PMMA/SWNTcomposite.
Figure 8:
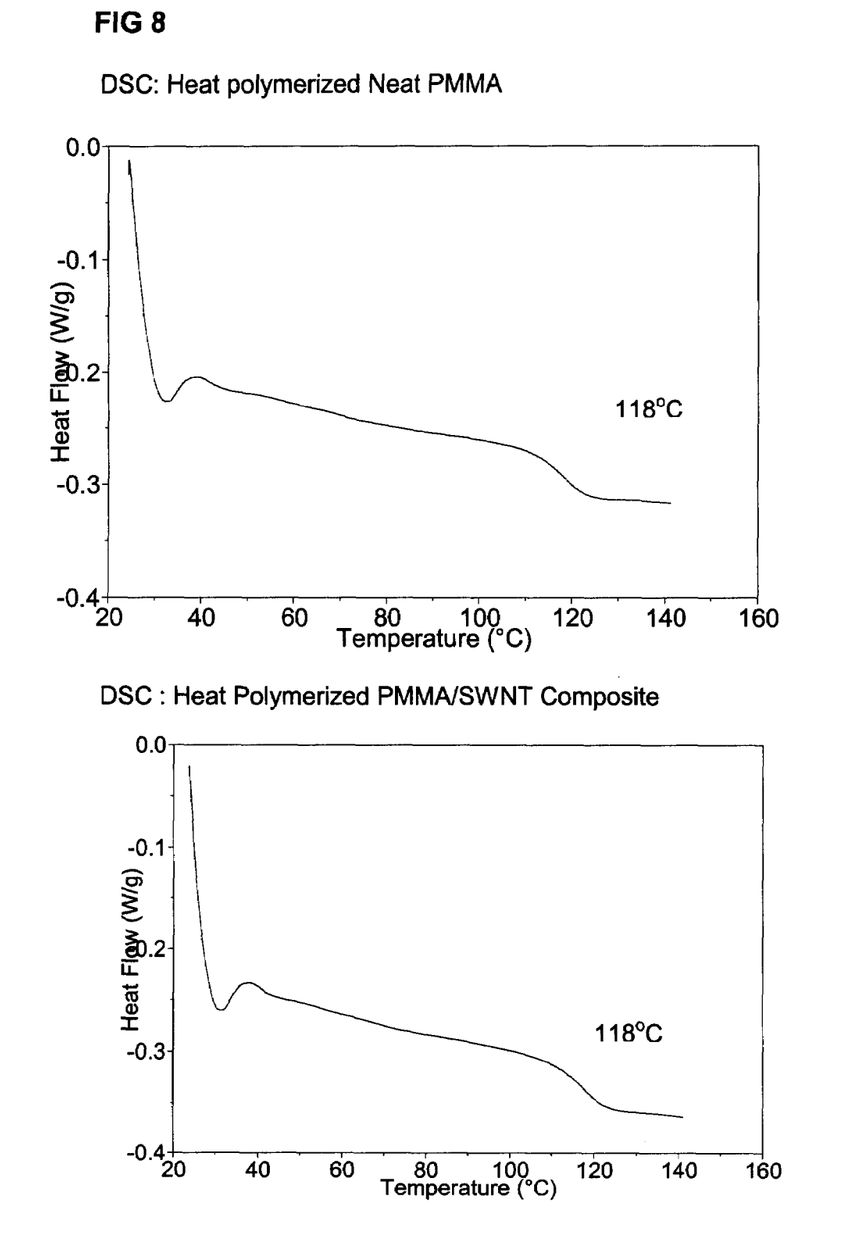
FIG. 8 illustrates the Differential Scanning Calorimetry plot of the oven polymerized neat PMMA and the PMMA/SWNTcomposite.
Figure 9:
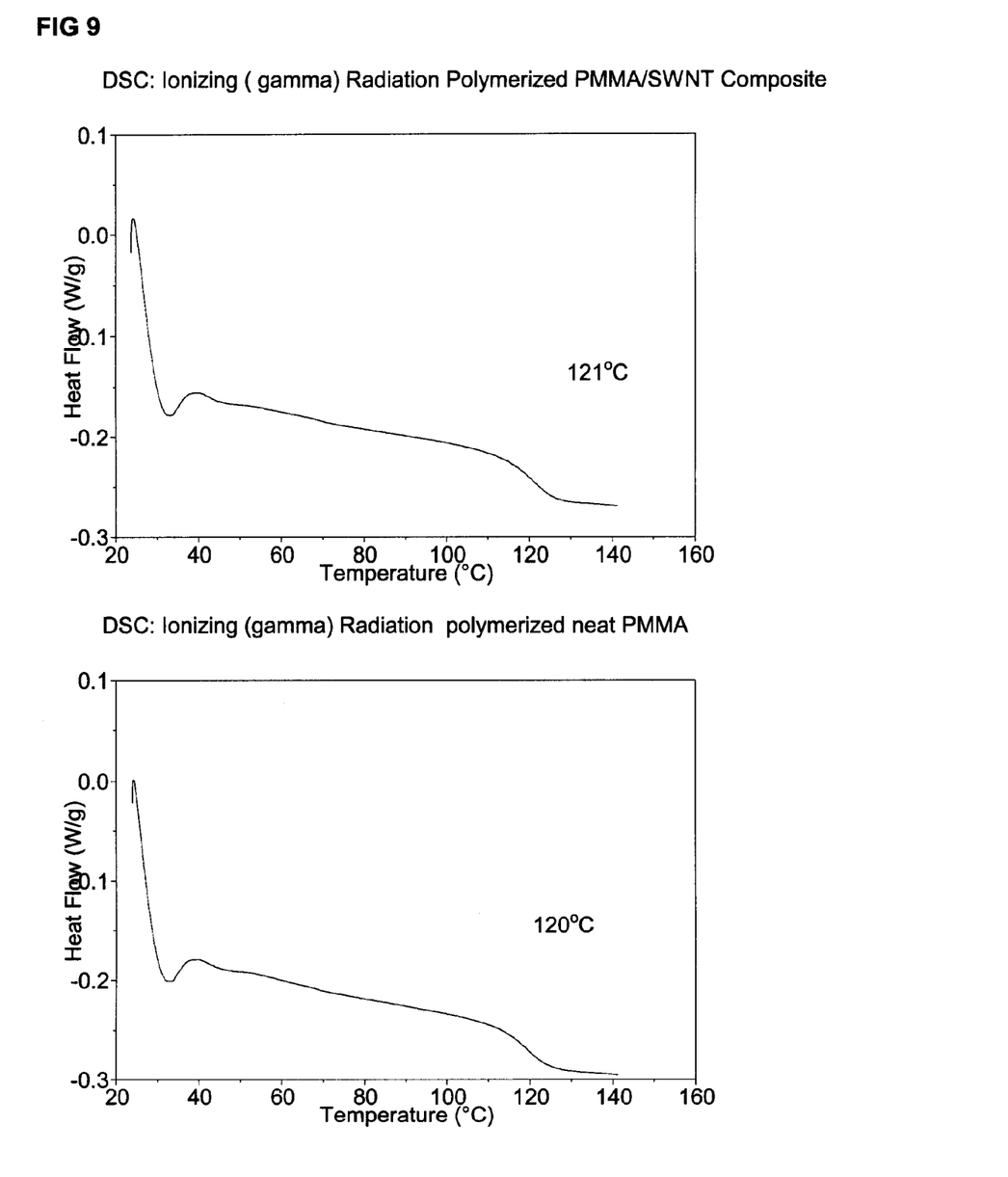
FIG. 9 illustrates the Differential Scanning Calorimetry plot of the Ionizing (gamma) radiation polymerized neat PMMA and the PMMA/SWNTcomposite.
Figure 10:
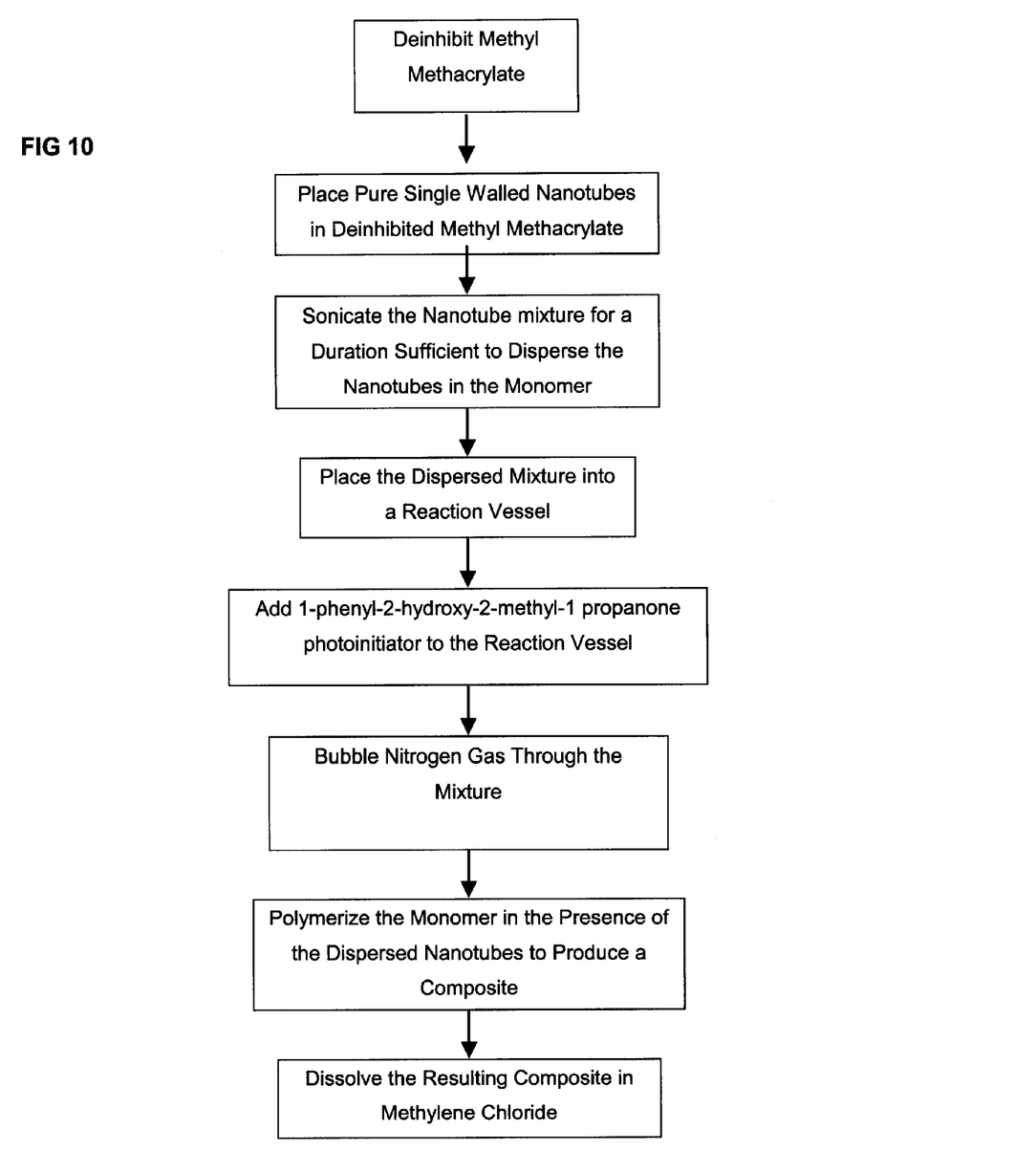
FIG. 10 is a flow diagram of a preferred embodiment of the process of the present invention.

The Dielectric Analysis (DEA) is an instrument that measures capacitance, a substance's ability to store energy, and conductance, a substance's ability to transfer electrical charge. Capacitance and conductance are measured as a function of time, temperature, and applied frequency. The DEA evidences two clear relaxations, in PMMA, the α and β relaxations. The α is the segmental motion of the polymer main chain. The β is the movement of the ester group about the carbon—carbon bond. PMMA also has an αβ relaxation which is the result of main chain slippage at high temperatures and high frequencies merged with the dominate β relaxation. Dielectric data was collected on a TA Instruments 2970 DEA. A temperature range between 200° C. to −150° C. in increments of −5° C. was used under a nitrogen purge. Parallel plate sensors were used. Frequencies ranged from 1 Hz to $1.0 \times 10^5$ Hz. A maximum force of 250 N was applied to the samples with the thickness ranging from 0.4 to 1.7 mm. Samples were compression molded in a carver press at 3000 pounds of pressure and a temperature of 275° F. Dielectric Analysis measure permittivity, also referred to as dielectric constant, measures the amount of alignment of the dipoles in an electric field. As shown in the table of FIG. 5, the permittivity increased for the composite samples as compared to the neat samples. The permittivity was taken at 100 Hz and 25° C. The permittivity increased for the UV polymerized composite and melt blended composite samples as compared to the UV polymerized neat PMMA sample. The dielectric constant values from DEA can be correlated to the refractive index values to better understand both the electronic nature of the polymer and the effect of the carbon nanotubes in the composite. This can be expressed through Maxwell's Relationship ($\epsilon = n^2$), which states that if a sample is a non-polar insulator, the dielectric constant can be expressed in terms of the refractive index squared. Accepted $n^2$ values for PMMA is 2.22. Accepted $\epsilon''$ values for PMMA range from 2.6–3.7. The UV polymerized composite had an $n^2$ value of 2.2239 and a $\epsilon''$ value of 7.2933 (taken at 100 Hz and 25° C.). Literature states that a large disparity between $\epsilon$ and $n^2$ may be a result of permanent dipoles and semi-conductive character in the samples. PMMA has permanent dipoles in the ester side group and it has been stated in literature that one third of carbon nanotubes are metallic and the remaining two thirds are conducting. This behavior from the carbon nantoubes compounded with the existing permanent dipoles, lead to the conductive nature of the composite; thus explaining the high dielectric constant of the UV composite as compared to the UV polymerized neat sample and the accepted literature value. The UV polymerized sample exhibited the largest increase in % change in permittivity, while the oven and gamma polymerized samples showed a similar percent change. As shown in the table of FIG. 6, glass transition temperatures (Tg) of the polymer samples were obtained on a TA 2920 Differential Scanning Calorimeter (DSC). A sample amount between 2–10 mg was obtained from the solvent evaporated film. The sample was heated to 145° C. at a heating rate of 10° C. per minute to insure that all samples had the same thermal history. Then the sample was cooled with liquid nitrogen to room temperature and heated to 145° C. The Tg values were taken from the second heat. The table of FIG. 5 shows the class transition temperatures for all six samples. Although it has been stated in literature that the glass transition temperature of the polymer matrix increases with the addition of single wall carbon nanotubes, the increase is not significant at such low concentrations. The glass transition temperatures are shown by the graphs of FIGS. 7,8, and 9. A higher loading of the nanotubes would create a composite that can be used in high temperature applications.

Based on the findings stated above, a thin film composite of poly (methyl methacrylate) and single- walled carbon nanotubes has been successfully fabricated with increased transparency and increased dielectric constants.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between. Now that the invention has been described,

The invention claimed is:

1. A method of preparing a polymer-carbon nanotube composite, the method comprising:
    providing an inhibited monomer composition
    deinhibiting said monomer;
    dispersing carbon nanotubes in the deinhibited monomer;
    adding an initiator to the resulting dispersion;
    polymerizing the monomer in the presence of the dispersed nanotubes to form a composite; and
    dissolving the resulting composite in a solvent.

2. The method of claim 1, wherein the carbon nanotubes are selected from the group consisting of single wall and multi-wall nanotubes.

3. The method of claim 1, wherein the carbon nanotubes are pure single-walled carbon nanotubes.

4. The method of claim 1, wherein the monomer is a vinyl monomer.

5. The method of claim 1, wherein the monomer is methyl methacrylate.

6. The method of claim 5, further comprising the step of deinhibiting the monomer by removing the inhibitor in the methyl methacrylate monomer utilizing monoethyl ether hydroquinone inhibitor remover.

7. The method of claim 1, whereby dispersing the nanotubes is affected through sonication.

8. The method of claim 1, whereby the initiator creates free radicals to initiate the polymerizing step.

9. The method of claim 1, wherein the initiator is substantially transparent.

10. The method of claim 1, wherein the initiator is an $\alpha, \alpha$ dialkyl derivative of a hydroxyalkylphenone.

11. The method of claim 1, wherein the initiator is 1-phenyl-2-hydroxy-2-methyl-1 propanone.

12. The method of claim 1, wherein adding the initiator further comprises bubbling nitrogen gas through the dispersion.

13. The method of claim 1, wherein polymerizing is achieved utilizing a method selected from the group consisting of ultraviolet light, thermal heating, and ionizing gamma radiation.

14. The method of claim 1, where the solvent is methylene chloride.

15. The method of claim 14, whereby a 5% solution was prepared by dissolving the composite in methylene chloride.

16. The method of claim 1, further comprising the step of filtering the solvent prior to the dissolving step.

17. The method of claim 1, further comprising post-curing the composite prior to the dissolving step.

18. The method of claim 1, further comprising isolating the nanocomposite by removal of the solvent after the dissolving step.

19. A method of preparing a polymer-carbon nanotube composite, the method comprising:
    deinhibiting a methyl methacrylate monomer;
    placing single-wall carbon nanotubes into the deinhibited monomer, forming a nanotube mixture;
    sonicating the nanotube mixture for a duration sufficient to disperse the nanotubes in the monomer; placing the dispersed mixture into a reaction vessel;
    adding a 1-phenyl-2-hydroxy-2-methyl-1 propanone initiator to the reaction vessel;
    bubbling nitrogen gas through the mixture for a duration sufficient to allow for a nitrogen environment in the mixture;
    polymerizing the monomer in the presence of the dispersed nanotubes to produce a composite; and
    dissolving the resulting composite in methylene chloride.

20. The method of claim 19, whereby a monomethyl ether hydroquinone inhibitor is removed from the methyl methacrylate monomer to deinhibit the monomer.

21. The method of claim 19, where the single-walled carbon nanotubes are 0.26% pure single-walled carbon nanotubes.

22. The method of claim 19 wherein polymerizing is achieved utilizing a method selected from the group consisting of ultraviolet light, thermal heating, and gamma radiation.

* * * * *

UNITED STATES PATENT AND TRADEMARK OFFICE
CERTIFICATE OF CORRECTION

PATENT NO. : 7,094,367 B1  Page 1 of 1
APPLICATION NO. : 10/604735
DATED : August 22, 2006
INVENTOR(S) : Julie P. Harmon, LaNetra Michelle Clayton and Patricia Muisener It is certified that error appears in the above-identified patent and that said Letters Patent is hereby corrected as shown below:

On the title page item (73), University of South Florida, Tampa FL (US)

Signed and Sealed this

Twenty-eighth Day of November, 2006

JON W. DUDAS
*Director of the United States Patent and Trademark Office*